M. E. B. WILLIAMS.
AWNING.
APPLICATION FILED OCT. 22, 1910.

1,011,688.

Patented Dec. 12, 1911.

WITNESSES

INVENTOR
Margaret Elizabeth Buddle Williams
by Attorneys

M. E. B. WILLIAMS.
AWNING.
APPLICATION FILED OCT. 22, 1910.
1,011,688.
Patented Dec. 12, 1911.
4 SHEETS—SHEET 2.
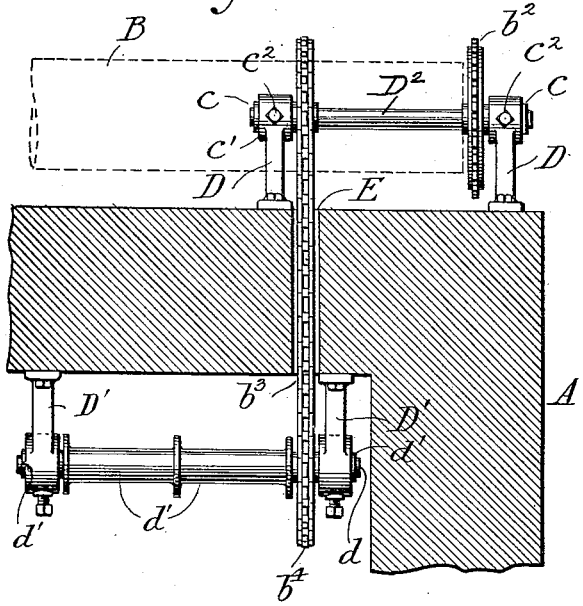
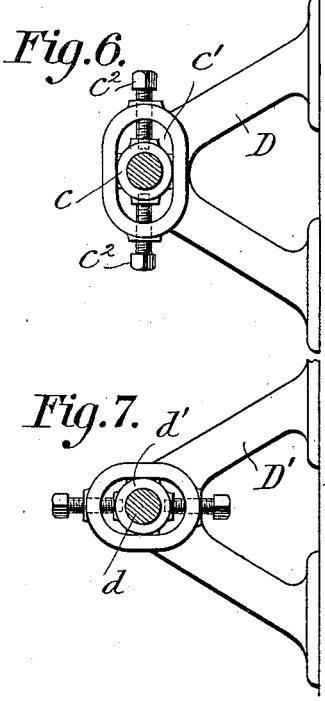
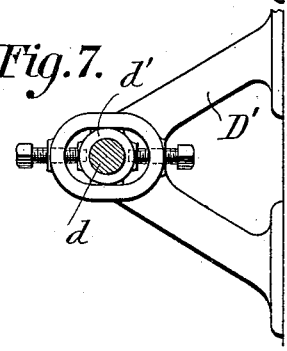
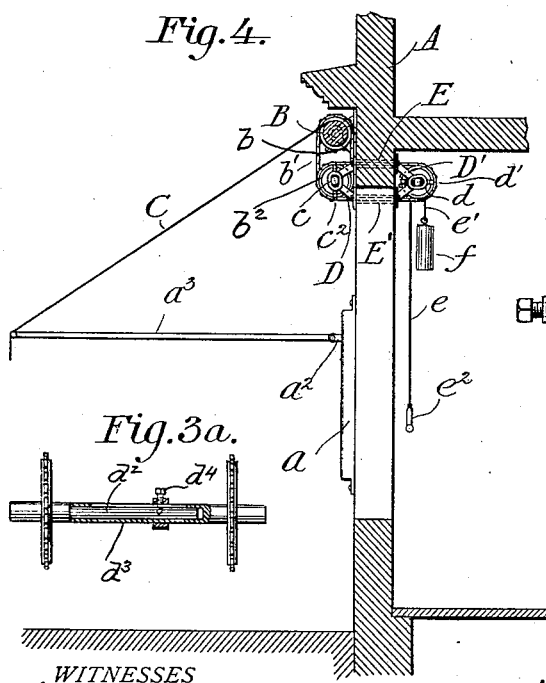
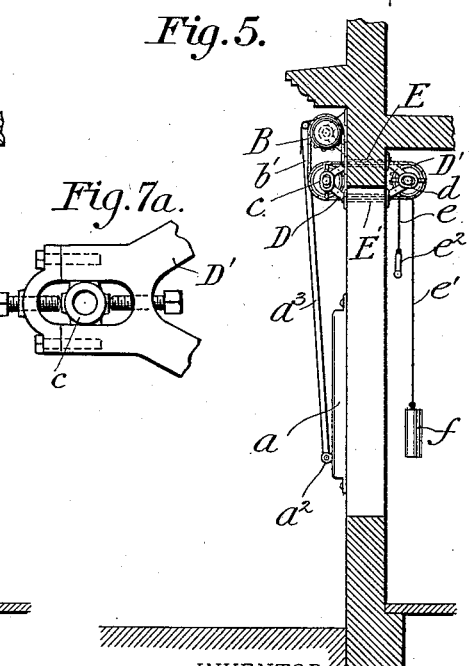
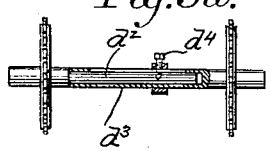
WITNESSES
INVENTOR
Attorneys

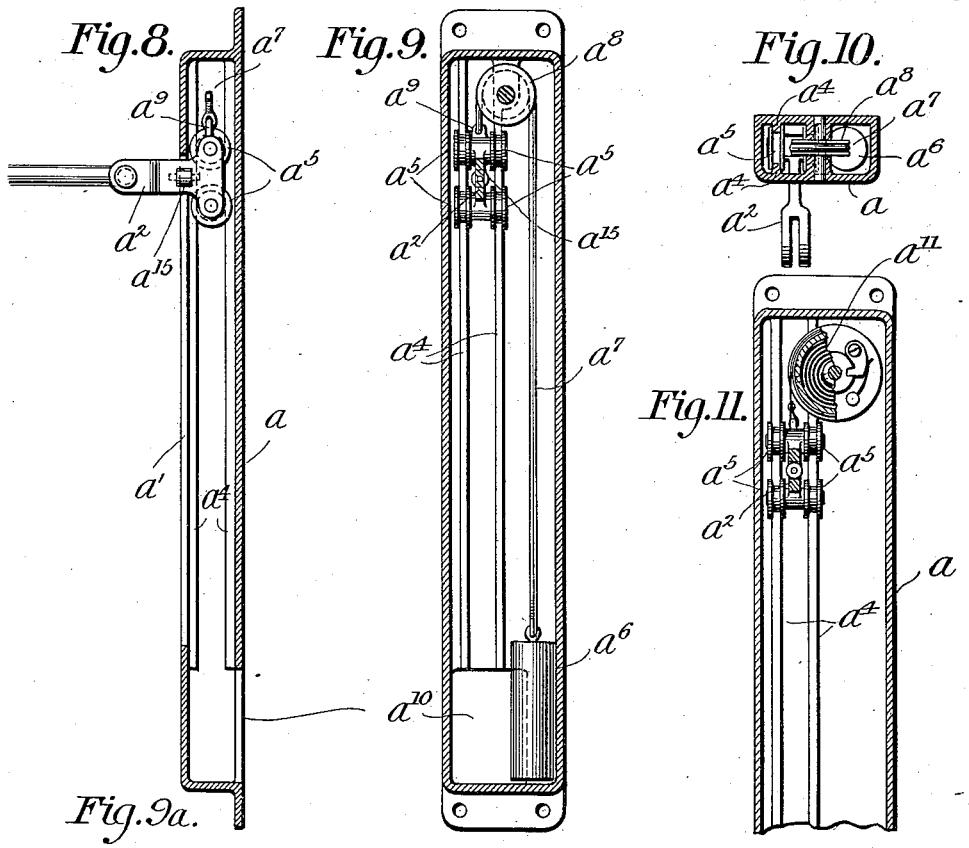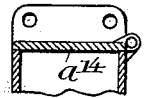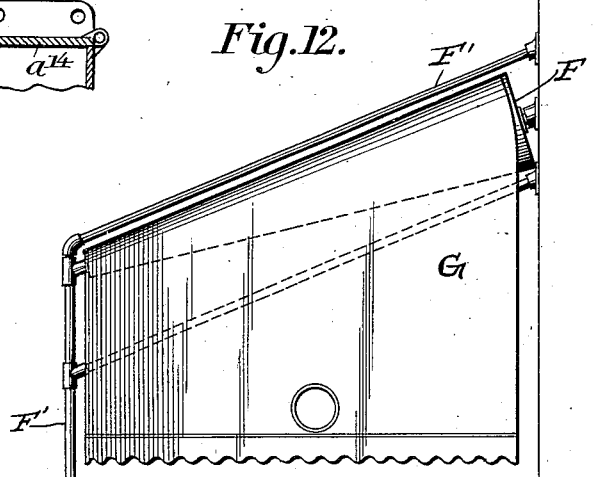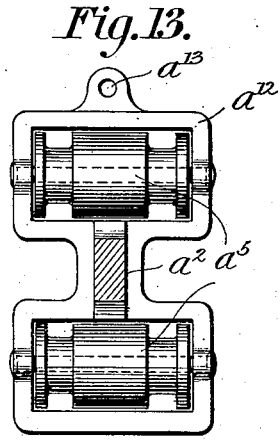

M. E. B. WILLIAMS.
AWNING.
APPLICATION FILED OCT. 22, 1910.

1,011,688.

Patented Dec. 12, 1911.
4 SHEETS—SHEET 4.

WITNESSES
Raymond T. Barnes.
Charles Lovell Howard.

INVENTOR
Margaret Elizabeth Budd Williams,
by her Attorneys

COLUMBIA PLANOGRAPH CO., WASHINGTON, D. C.

UNITED STATES PATENT OFFICE.

MARGARET ELIZABETH BEEDLE WILLIAMS, OF WESTERN PORT, MARYLAND.

AWNING.

1,011,688.  Specification of Letters Patent.  Patented Dec. 12, 1911.

Application filed October 22, 1910. Serial No. 588,492.

*To all whom it may concern:*

Be it known that I, MARGARET ELIZABETH BEEDLE WILLIAMS, a citizen of the United States, residing at Western Port, in the county of Allegany and State of Maryland, have invented new and useful Improvements in Awnings, of which the following is a specification.

In considering the objects and advantages of my invention it may be mentioned that the awning may be used with or without end curtains or sections; that it is capable of operation entirely from the inside of the building to which it is applied, and so balanced that it may be raised and lowered as may an ordinary corded and weighted window; that the means used for manipulation may be placed at any convenient part of the building in the line of movement of the awning; that chains, crank boxes and other appliances ordinarily used on the outside of the building are dispensed with; that the awning may be applied to the doors or windows or fronts of different stories of a building; that when used upon the ground floor the inconvenience of using an awning rod or brace which will be so low as to offer an obstruction to persons passing on the sidewalk is avoided; that the parts or elements employed are few in number and not liable to get out of order, and that the chains or other similar means used in the manipulation of the awning may be adjusted with respect to tension.

Other objects and advantages will appear hereinafter.

In the accompanying drawings, Figure 1 shows in front elevation a form of my invention applied to the ground floor of a building comprising a central door and a window on either side thereof. Fig. 2 is a sectional elevation viewed from within the building, showing parts of the invention optionally disposed. Fig. 3 is a detail upon enlarged scale, and in horizontal section, showing mechanism seen at the upper right hand corner of Fig. 2. Fig. 3ª shows an optional form of the outer shaft of Fig. 3. Fig. 4 is a vertical section showing the awning of Fig. 1 dropped, and means within the building whereby it is operated. Fig. 5 is a similar view showing the same awning raised. Figs. 6, 7 and 7ª show enlarged details hereinafter described. Fig. 8 (also with others enlarged) is a vertical side section of a detail, and Fig. 9 a vertical front section thereof. Fig. 9ª shows a modification of Fig. 9. Fig. 10 is a horizontal section of Fig. 9, and Fig. 11 a vertical front section showing the substitution of a spring as the equivalent of the weight of Figs. 9 and 10. Fig. 12 is a view in elevation showing an end awning. Fig. 13 shows a modification of a detail seen in Figs. 8, 9 and 10. Fig. 14 presents a side elevation showing a form of my awning let down. Fig. 15 shows the same, the awning being raised. Fig. 16 is a side elevation showing a modification of Figs. 14 and 15. Fig. 17 is a front and exterior elevation of a form of my awning with a modification in the means of manipulation. Fig. 18 shows the same mechanism from the interior of the building. Figs. 19, 20, 21 and 21ª are details hereinafter described.

A represents the wall of the building to which the awning C is applied. As shown in Fig. 1, the device is let down or unrolled and extends across to shade the entire front of the ground floor of a building having a central door and a window on either side thereof. The awning roller is shown by B. At suitable parts of the front of the building are placed slide boxes $a$, indicated in Fig. 1 as four in number. These slide boxes are shown enlarged in Figs. 8, 9, 10 and 11, of which further description is given hereinafter. In all forms the slide box is provided with a front slot $a'$ through which slots project slides $a^2$ to which the awning rods $a^3$ are hinged. While as seen in Figs. 1 and 4 the awning is not provided with end portions, it, as preferably used, consists of a main or front part and end sections, it being, as will hereinafter appear, an object of my invention to enable the whole awning, both its front portion and its ends, to be conveniently unrolled and rolled.

Figs. 3 and 4, the former being upon enlarged scale, indicate the simplest form of mechanism employed by me in the manipulation of such an awning as is seen in Figs. 1 and 4. In these figures, the awning being shown let down or unrolled, each of the slides $a^2$ is elevated to the upper portion of the slot $a'$ of its slide box $a$. The roller B is mounted exteriorly at the upper part of that portion of the building intended to be shaded, and is provided with a sprocket wheel $b$, Fig. 4, which by means of a sprocket chain $b'$ is connected to the sprocket wheel $b^2$ immediately below that of the roller. The wheel $b^2$ is supported by a bracket D, Fig. 6, and mounted upon a countershaft $D^2$ having an adjustable bearing $c$ whereby the sprocket wheel may be adapted to slide in a slot $c'$ of the bracket, the adjustment of the bearing being effected by means of set screws $c^2$. This countershaft may be made extensible as shown in Fig. 3ª in order to adapt it to different frontages, thickness of walls or other variable conditions. The shaft is made telescopic, it having an inner solid member $d^2$ and an outer slotted tubular member $d^3$. This telescopic modification of the counter shaft having been brought to give the required distance between the sprocket wheels, is set at that distance by a suitable clamping device $d^4$.

The front of the building is provided with horizontal openings E E′, Figs. 3 and 4, through which passes a sprocket chain $b^3$ which engages a sprocket wheel $b^4$ within the building. The last named wheel is supported by a bracket D′ within the building and is mounted upon a shaft $d$ having adjustable bearings $d'$, all as seen in Fig. 7. The bracket may be made separable as seen for example in Fig. 7ª, to admit of the lifting out of the parts held thereby. By means of the adjustable bearings of the brackets D and D′ the tightening or loosening of the sprocket chains $b'$ and $b^3$ is readily accomplished. The brackets D′ being upon the inside of the building, see especially Fig. 3, the roller portions $d'$ of the shaft $d$ furnish means whereby the awning may be manually operated from the interior of the building. Such means are shown in Figs. 2, 4 and 5 consisting of a pull cord $e$ which winds over one of the sections of the roller portions $d'$, while a cord $e'$ winds over the other roller section $d'$, it being provided with a counterweight $f$. In the position in which the awning is shown in Fig. 4 it will be understood that the cord $e$ has been pulled down by the operator using the handle $e^2$ against the gravity of the weight $f$, the cord $e'$ of which is wound up by the same action. Fig. 5 shows the position of the awning before this action, from which it will be seen that the slides $a^2$ are at the bottom of the slots $a'$ of the slide boxes $a$; that the awning rods $a^3$ are practically vertical, and that the handle $e^2$ is elevated and the weight $f$ lowered. In changing the position of the awning from the position of Fig. 4 to that of Fig. 5, the pull may be exerted upon the counterweight $f$. The diameter of the roller section $d'$ is as small as is expedient in order to lessen the distance required to be traveled by the counterweight $f$.

Fig. 1, as hereinabove stated, shows generally an awning of ordinary form, that is to say, one without end sections but which, in accordance with my invention, is operated from the interior of the building and which differs from awnings of this general class in features of mechanical construction and arrangement. In Fig. 2 an optional mode of winding or rolling and unrolling such an awning as that of Fig. 1 is shown. At the right of the figure the winding and unwinding and weighting means are shown in full lines at the right hand wall of the building, whereas the dotted lines at the left show similar means at or near the center of the building.

In Figs. 8 and 9 the slide boxes $a$ are shown with their slides $a^2$ provided with a weighting device. As indicated in these figures, the interior of the slide box is provided with tracks $a^4$ upon which slide the rollers $a^5$ mounted in the slide $a^2$. These slides are counterbalanced or counterweighted by means of a weight $a^6$, the cord $a^7$ of which passes over a sheave $a^8$ journaled in the upper part of the slide, the said cord attaching at $a^9$ to the frame of the rollers $a^5$. The weight $a^6$ may be inserted to and removed from the interior of the slide casing through the hole $a^{10}$, but in the construction shown in Fig. 9ª, the hole $a^{10}$ is or may be omitted, and the upper end of the slide box made open and be closed by a lid $a^{14}$, the open-topped slide box admitting of the insertion and removal of all interior fittings. A similar arrangement of slide box is shown in vertical section in Fig. 11, but instead of the weight a coiled spring $a^{11}$ is used for counterweighting the awning extension rods. A small roller $a^{15}$, carried by the slide $a^2$, prevents a binding of the slide against the edges of the slot of the slide box. See particularly Fig. 8. In Fig. 13 an equivalent form of the roller portion of the slide in shown, the rollers $a^5$ being inclosed in a suitable frame $a^{12}$ to which the cord which passes over the sheave, or a spring, if the latter is used, is attached as at $a^{13}$.

Thus far I have mainly confined the description to an awning not having end sections, but an important feature of my invention is in an awning provided with a main front or central part and end portions all of which shall be capable of being simultaneously rolled and unrolled, that is to say, raised or lowered. In considering this feature of my invention, reference may be first made more especially to Figs. 14 and 15. Here I have shown, as means for winding each of the end portions of the awning, a tapered roller F mounted in a manner similar to that of a curtain roller upon a central shaft having bearings $g$ $g'$, and provided with an internal spring which may be placed under tension and which at the proper time may be used for winding up the end portions of the awning. This arrangement employed by me, however, differs from an ordinary spring curtain roller in that it does not have stops which, as in the curtain fixture, allow the curtain to be adjusted to a required height. Fig. 14 shows this tapered roller F, the end section of the awning being unrolled or dropped, and Fig. 15 the elevated or closed position of the awning. The internal spring is shown in Fig. 16 by dotted and in Fig. 20 by full lines and marked $g^2$. In Fig. 16 the position of the tapered or conical roller F' is changed, and instead of its being vertically mounted upon a shaft as in Figs. 14 and 15, it is pivoted at $g^3$ to a slide $a^2$ which runs in a slide box $a$, as heretofore described, and above the casing and fixed to the front wall of the building, are rods $h$ upon which are rings $h'$ attached to the edges of the end awning and which slide upon the rods as the end portion is rolled upon the roller F'. The end curtain is simply attached to the top awning by putting the ring $a^{16}$ at the end of the curtain over the front rod $a^{17}$ of the awning, (see the enlarged detached view at Fig. 16) and stiffening pieces may be put in the end curtain, if so desired. The tapered roller is preferably made of some light weight material that will not rust, and is covered in some appropriate manner to protect it from the weather.

In Figs. 19, 20 and 21 is shown a form of conical spring roller, the taper of which may be varied. At the larger end of the roller is a head $k$ having a series of annular flanges $k'$. Instead of the series of annular flanges $k'$, where a union is made between the roller and the head, the parts may be united by fitting the larger end of the conical lapped roller in the spiral groove $k^6$ shown in Fig. 21$^a$, whereby the compression and distention of the roller may be effected by turning the head. It will be understood that the relative arrangement between the perforations $k^4$, Fig. 20, and the pins $k^5$ will be such as to admit of the proper clearance for the change in size of the roller. At the opposite or smaller end of the roller is a flanged closure $k^2$. The body $k^3$ of the roller, while in one section of metal, is folded or flapped upon itself, one of its flaps being provided with a series of perforations $k^4$ and the other with a series of pins $k^5$. As shown in Fig. 20, the conical roller is fully distended, but as will be seen, it may be closed into smaller circular size and its larger end fitted between any other two of the flanges $k'$ thereby to be retained in its compressed form, or it may be compressed by means of the device shown in Fig. 21$^a$.

In Fig. 12 I have shown a convenient arrangement for an end awning or shade G which may be used independently of a main or front awning. This figure will be understood by reference to what has been said with respect to the construction of the conical winding roller and its adjuncts. Here the roller F is supported at the front of the building by a suitable tubular framework F'. The roller shown in Fig. 12 may be modified as seen in Figs. 19, 20, 21 and 21$^a$, and also conveniently operated in a manner similar to that in which an ordinary window shade is worked, or in accordance with such manipulations hereinbefore described, as are applicable to this arrangement.

The locking dogs shown in Figs. 11 and 19 are not intended to act as such devices are employed in ordinary shade curtains, but simply to allow of the setting up of the initial tension of the spring to compensate for the weight of the extension rods, the awning and other elements.

My invention is applicable to an awning of large or small size, and it has been found in the practical operation of awnings of a certain character that it will not fall by its own weight until it is unrolled a certain length, in which case it will be required to give it a start by manual effort. Furthermore, such counterweight must be employed as will prevent the awning from falling too rapidly and also to cause it to be easily pulled up. The special automatically-acting or counterbalanced features shown in Figs. 8, 9, 10 and 11, whether of the weight or spring character, may be employed as suited to the size and character of the awning.

Modification may be availed of in the various parts and arrangements herein shown, as in the slide boxes shown particularly in Figs. 8, 9, 10 and 11. Thus if a spring is used it must be such as can be made to act with greater or lesser force as is common with spring window shades, and if a weight is employed it should have an opening or cavity in which shot or other weighting medium may be placed in order to vary the weight. In order to more readily force the slides to the bottom of the slide boxes, weight may be added to the frame by inserting a bar in the front rod, which is preferably hollow, and also in the end of each of the extension rods next to the front rod, although ordinarily it has been found that the weight of the tubular frame without additions has been sufficient for the purpose. The counterbalancing or counterweighting of the awning, especially one of large size, is a consideration of importance, as it must be allowed to fall easily and prevent danger or inconvenience. Proper provision must be made as to the strength and action of the springs employed in the rolling and unrolling of the end sections, and the required taper given to the rollers for use with said sections will be governed by the slope of the curtain.

As hereinbefore stated, the awning may be worked from any convenient point within the building adjacent to the wall, as behind a door instead of in a corner as shown in Fig. 2.

Figure 1:
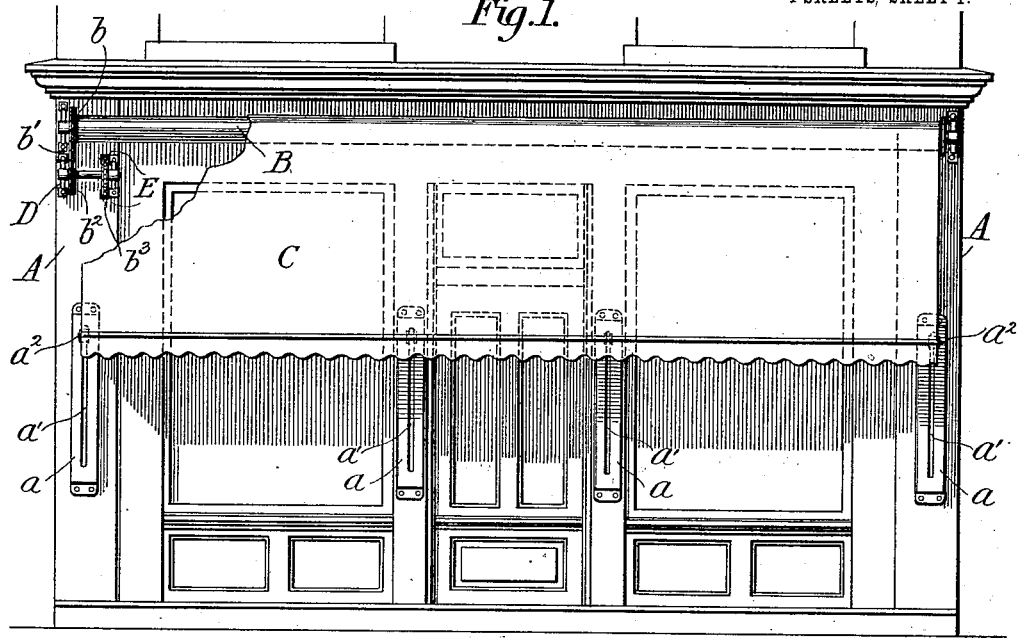
Figure 2:
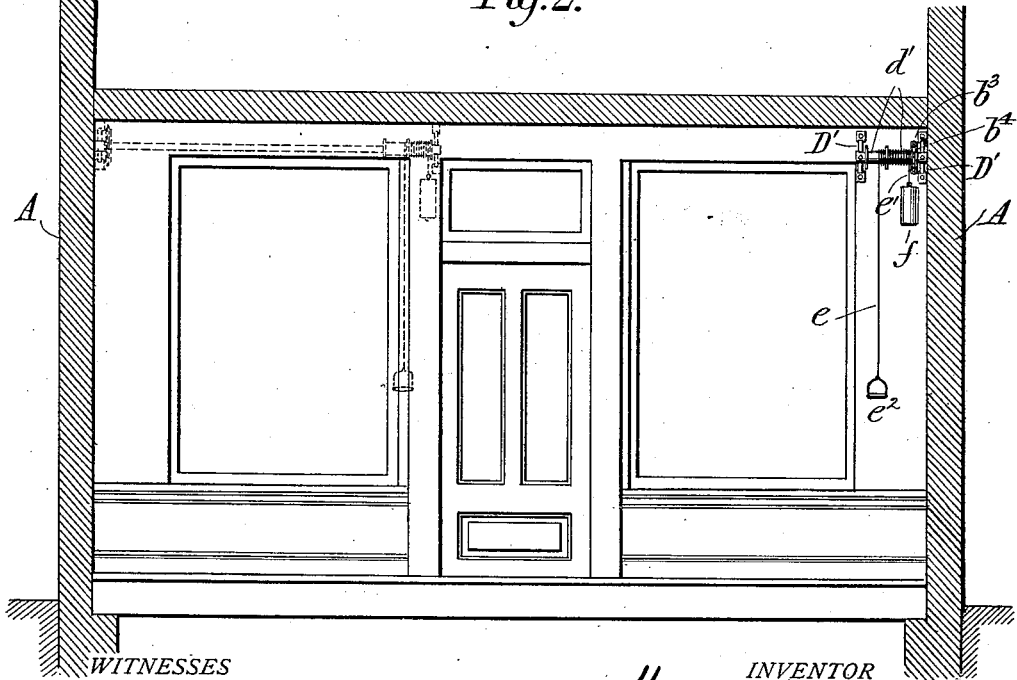
Figure 14:
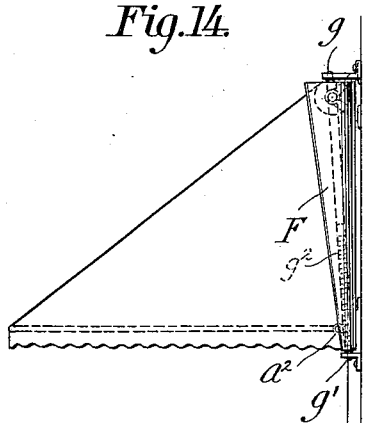
Figure 15:
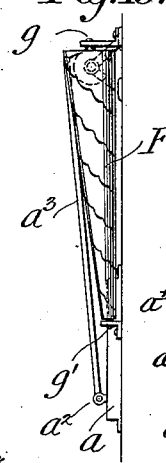
Figure 16:
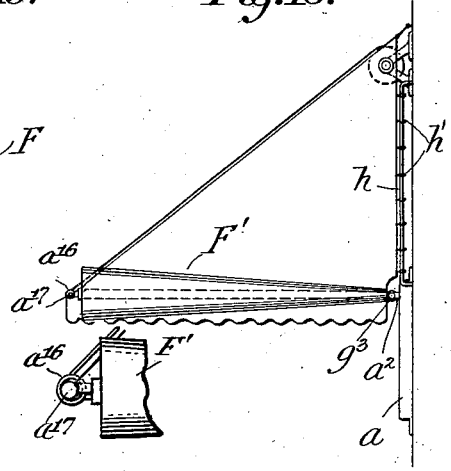
Figure 17:
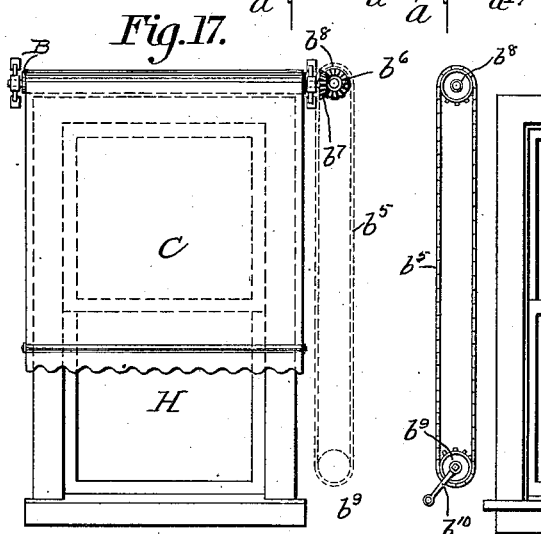
Fig. 17 shows as means for manipulating the awning C applied to a window H, an endless sprocket chain $b^5$ with its wheels $b^8$, $b^9$ inside the building. The chain $b^5$ and wheels $b^8$, $b^9$, are shown in dotted lines, the said sprocket mechanism operating the exterior bevel gears $b^6$, $b^7$, the latter being upon the shaft of the roller B.
Figure 18:
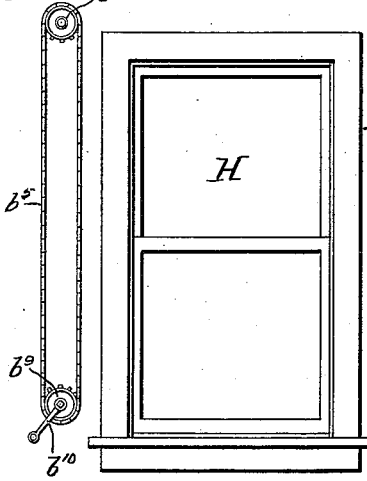
Fig. 18 shows in full lines the sprocket and chain mechanism $b^5$, $b^8$, $b^9$ from the interior of the building, the lower sprocket wheel $b^9$ being operated through the hand crank $b^{10}$.
Figures 19, 20, 21:
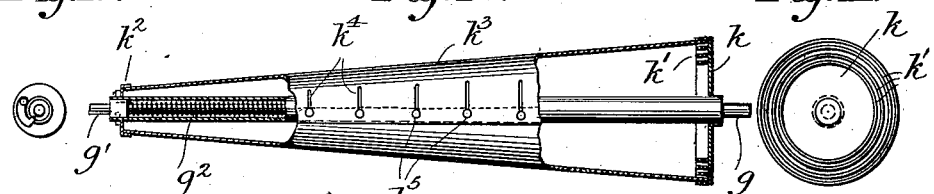
Figure 21A:
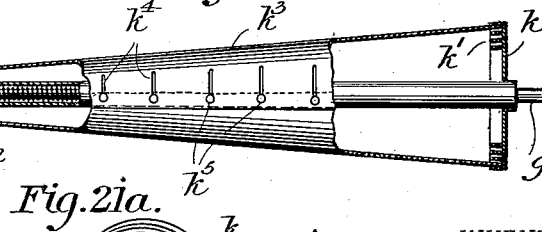

The slide casings or boxes and any other prominent feature of my invention visible from the exterior of the building may be given the color of the latter so as to render them as inconspicuous as possible.

Having thus described my invention, I claim:—

1. A flexible awning, a springless roller on which said awning is adapted to be wound, and a roller-operating sprocket wheel and chain mechanism, all exterior of the building, combined with a sprocket wheel and winding and counterbalancing means within the building, and a chain passing through a wall of the building and connecting the interior and exterior sprocket wheel mechanisms, substantially as set forth.

2. A flexible awning, a springless roller on which the awning is wound, and sprocket and chain mechanism, all exterior of the building, combined with a sprocket wheel mechanism and a counterbalancing device within the building, and a chain passing through a wall of the building and engaging the interior and exterior sprocket wheel mechanisms, said interior and exterior sprocket and chain mechanisms being relatively adjustable, substantially as set forth.

3. A flexible awning, a springless roller on which the awning is wound, the shaft of said roller being mounted in bearings exterior of the building, extension rods, automatically-acting sliding devices for said rods, a sprocket wheel upon the roller shaft, a coöperating sprocket wheel mounted upon an adjacent shaft, a sprocket wheel and a counterbalancing device mounted within the building, sprocket chains one of which passes through the building wall for connecting the sprocket wheel mechanisms within and exterior of the building, and means for adjusting the relative arrangement of the interior and the exterior sprocket wheels, substantially as set forth.

4. A flexible awning having a main section and also end sections, means for connecting said main and end sections, a springless roller exterior of the building, on which roller the main section of the awning is wound, a sprocket and chain mechanism exterior of the building for operating the main section, a sprocket mechanism within the building and a chain mechanism acting therewith and passing through a wall of the building for co-acting with said exterior mechanism, combined with tapered spring rollers upon which the end sections of the awning are adapted to automatically wind, substantially as set forth.

5. A flexible awning having a main and also end sections, means for connecting said main and end sections, a springless roller exterior of the building upon which roller the main section is wound, a sprocket and chain mechanism exterior of the building for operating the main section, a sprocket mechanism within the building and a chain co-acting therewith and passing through the building for coaction with said exterior mechanism, said mechanisms being adjustable with respect to each other, combined with tapered spring rollers upon which the end sections are adapted to automatically wind, substantially as set forth.

6. A flexible awning having a main section and end sections, means for connecting said main and end sections, a springless roller exterior of the building upon which the main section of the awning is wound, a sprocket and chain mechanism exterior of the building for operating the main section, a sprocket wheel mechanism within the building, and a chain coacting therewith and passing through a wall of the building for coaction with said exterior mechanism, combined with tapering spring rollers having means rendering them capable of variation in taper, upon which rollers the end sections are adapted to automatically wind, substantially as set forth.

7. A flexible awning, a springless roller on which the awning is adapted to be wound, a sprocket wheel upon the roller shaft, a coöperating sprocket wheel mounted upon an adjacent shaft, awning extension rods and counterbalanced devices therefor, all of the foregoing parts being exterior of the building, combined with a sprocket wheel mounted within the building, sprocket chains connecting said sprocket wheels, one of said chains passing from the interior of the building through a wall thereof to the exterior, and a counterbalancing device within the building for the winding mechanism, substantially as set forth.

8. A flexible awning, a springless roller on which the awning is adapted to be wound, a sprocket wheel upon the roller shaft, a coöperating sprocket wheel mounted upon an adjacent shaft, awning extension rods and counterbalanced devices therefor, all of the foregoing parts being exterior of the building, combined with a sprocket wheel mounted within the building, sprocket chains connecting said sprocket wheels, one of said chains passing from the interior of the building through a wall thereof to the exterior, a counterbalancing device within the building and means for adjusting the tension of said chains, substantially as set forth.

9. A flexible awning having a main section and also end sections, means for connecting said main and end sections, a springless roller exterior of the building, on which roller the main section of the awning is wound, a sprocket and chain mechanism exterior of the building for operating the main section, a sprocket mechanism within the building and a chain mechanism acting therewith and passing through a wall of the building for coacting with said exterior mechanism, combined with tapered spring rollers upon which the end sections of the awning are adapted to automatically wind, and means for varying the taper of said spring rollers, substantially as set forth.

In testimony whereof I affix my signature in presence of two witnesses.

MARGARET ELIZABETH BEEDLE WILLIAMS.

Witnesses:
RICHARD LAUGHLIN,
PATRICK FRANCES LAUGHLIN.

Copies of this patent may be obtained for five cents each, by addressing the "Commissioner of Patents, Washington, D. C."